(No Model.)

E. W. STORER.
VALVE.

No. 457,680. Patented Aug. 11, 1891.

WITNESSES:
F. McArdle,
C. Sedgwick

INVENTOR
E. W. Storer
BY Munn & Co.
ATTORNEY.

THE NORRIS PETERS CO., PHOTO-LITHO., WASHINGTON, D. C.

UNITED STATES PATENT OFFICE.

EDWIN W. STORER, OF PHILADELPHIA, PENNSYLVANIA.

VALVE.

SPECIFICATION forming part of Letters Patent No. 457,680, dated August 11, 1891.

Application filed May 1, 1891. Serial No. 391,230. (No model.)

*To all whom it may concern:*

Be it known that I, EDWIN W. STORER, of Philadelphia, in the county of Philadelphia and State of Pennsylvania, have invented a new and Improved Valve, of which the following is a full, clear, and exact description.

My invention relates to improvements in that class of valves which are adapted to be used in connection with a dry-pipe automatic fire-extinguishing system. In systems of this class the pipes which are carried around through the buildings and which are provided with automatic sprinklers do not contain water, but are filled with compressed air, and the pipes are connected by a valve with the water-supply, so that if a rise in temperature opens the sprinklers and allows the air to escape the removal of the air-pressure actuates the water-valve and lets the water run into the dry-pipes and out through the sprinklers.

The object of my invention is to produce an automatic valve adapted for use in connection with a system of this character, which valve is of simple construction, is positive in operation, is held in place by a very small air-pressure, and is very inexpensive.

To this end my invention consists in a valve constructed substantially as hereinafter described and claimed.

Reference is to be had to the accompanying drawings, forming a part of this specification, in which similar figures of reference indicate corresponding parts in both the views.

Figure 1:
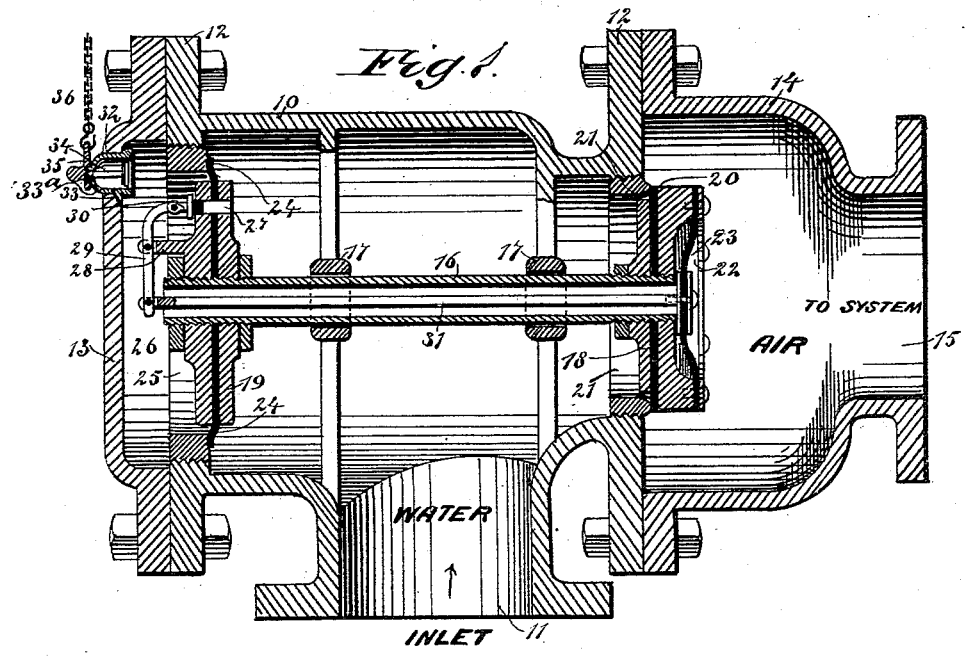
Figure 2:
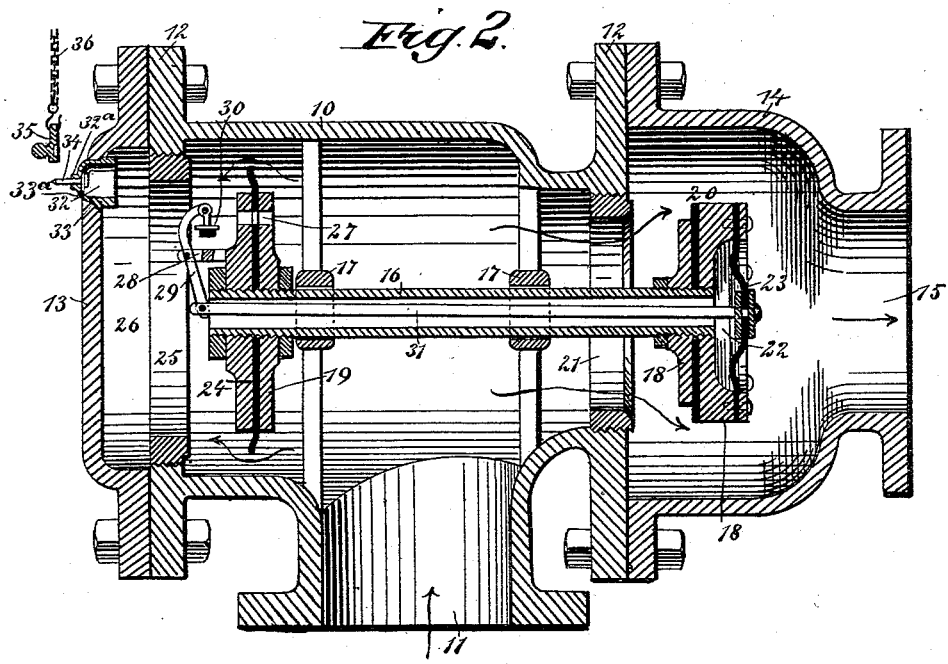

Figure 1 is a longitudinal vertical section of the valve, showing the same in its normal or closed position; and Fig. 2 is a similar section, but with the valve open.

The valve-case 10 is provided with an inlet 11 of the usual character and with ordinary end flanges 12, which adapt it for attachment at one end to a cap 13 and at the other end to a coupling 14, which coupling opens at 15 into the system-pipes, which are filled with compressed air, and the back-pressure of the air enters the coupling and presses against the valve. A tube 16 extends longitudinally through the valve-case, being held in suitable supports 17, in which it may slide, and this tube carries at one end a valve 18 and at the opposite end a valve 19. The valve 18 is arranged within the coupling 14 and is provided with a packing 20, which fits closely against the seat 21, and this seat is preferably in the form of a ring, which is screwed into one end of the valve-case. The valve 18 is centrally chambered on the side next the air-pipe, as shown at 22, and extending across this chamber is a flexible diaphragm 23. The valve 19 is arranged in the opposite end of the case and is provided with a flexible packing-ring 24, which projects from the periphery of the valve and which fits closely against the seat 25 in the end of the valve-case. By having this packing-ring flexible, as described, and having it project from the valve, it will be seen that it will always fit the seat when there is any pressure upon the valve, even though the valve should not be very nicely adjusted upon the tube 16. By reference to the drawings it will be seen that a chamber 26 is formed between the valve 19 and the cap 13. This chamber may connect with the chamber in the valve-case through a duct 27, leading through the valve 19; but the duct is normally kept closed by the following mechanism: On a lug 28, which projects from the back side of the valve 19, is centrally pivoted a lever 29, the lower end of which extends downward opposite the end of the tube 16, and the upper end of which is pivotally connected with a valve 30, which valve fits closely in the duct 27 and closes the same. The valve is held in position by the connecting-rod 31, which is pivoted to the lower end of the lever 29, and extends longitudinally through the tube 16, one end of the rod being secured to the center of the flexible diaphragm 23. It will thus be seen that the pressure of air upon the diaphragm will move the diaphragm inward, and thus push the rod 31 longitudinally, so that it will press firmly outward upon the lower end of the lever 29 and hold the valve 30 in place, and as the area of the diaphragm is very much greater than the area of the valve 30 it will readily be seen that the valve will be held so securely closed that there can be no danger of its accidental displacement.

In the upper portion of the cap 13 is a small cylinder 32, which is open at the inner end, and which carries a piston 34, which piston projects outward through the end of the cylinder and presses against a button 35, which connects by a chain 36 with an alarm mechanism, so that when the piston is moved outward and the button pushed from the cylinder the alarm will be released and sounded. The cylinder 32 is provided at its outer end with a projection 32ª, adapted to receive the button 35, and the cylinder connects with the chamber 26 by means of a duct 33, and this will prevent the accumulation of water enough in the chamber 26 to counterbalance the water-pressure on the inner side of the valve 19 and enable the valve to be accidentally opened, as the water may enter the cylinder through the duct 33 and flow out through the opening 33ª in the outer portion of the cylinder; but when the piston 34 is forced out it closes the opening 33ª, as in Fig. 2. It will be noticed that the area of the valve 19 is somewhat greater than that of the valve 18, and as a result the incoming water-pressure will of itself naturally hold the valve closed, and this tendency is augmented by the pressure of the air from the dry pipe.

The operation of the valve is as follows: If the rise in temperature at any point in the dry-pipe system opens one of the automatic sprinklers and removes the air-pressure from the pipe, the pressure will be also removed from the diaphragm 23, and the water-pressure will open the valve 30 and allow the water to flow through the duct 27 into the chamber 26, thus filling the chamber, and when the chamber is filled the water therein will serve as a counter-balance for the water in the main case 10. The water-pressure will then be in one direction and upon the valve 18, and as a result the valve will be pushed open and the water will rush inward by the valve, as indicated by the arrows in Fig. 2, and will supply the sprinkler-pipes. At the same time the water will have filled the chamber 26, pushed outward the piston 34, and pushed the button 35 from the cylinder 32, and the button will release the alarm mechanism, so that an alarm will be sounded. If desired, the cap 13 may be locked to the case 10, so as to prevent any one from tampering with the valve.

Having thus fully described my invention, I claim as new and desire to secure by Letters Patent—

1. A valve of the character described, comprising a case having an inlet on one side, an outlet at one end, and a chamber on the opposite end, a longitudinally-movable tube mounted centrally in the valve-case, a valve secured to each end of the tube, one valve being arranged adjacent to the outlet, seats for the valves, a duct leading through the inner valve, an auxiliary valve for the duct, and a lever mechanism connecting the auxiliary valve with a flexible diaphragm arranged on the outer side of the outer valve, substantially as described.

2. In a valve of the character described, the combination, with a main case having a side inlet, an end outlet, and a chamber in the end opposite the outlet, of a tube held to move longitudinally in the case, said tube having at its outer end a valve to close the outlet and at its inner end a valve to close the entrance to the chamber, the outer valve having a chambered outer side, a diaphragm extending across the chamber of the valve, a rod connected with the diaphragm and extending longitudinally through the tube, a plug-valve to fit a perforation in the inner valve, and a lever connection between the plug-valve and the rod, substantially as described.

EDWIN W. STORER.

Witnesses:
CHARLES L. QUIMBY,
FRED. HASKINS.